Sept. 19, 1950     E. W. MEDBERRY     2,523,224
RECIPROCATING FEED MECHANISM
Filed June 10, 1947     4 Sheets-Sheet 1
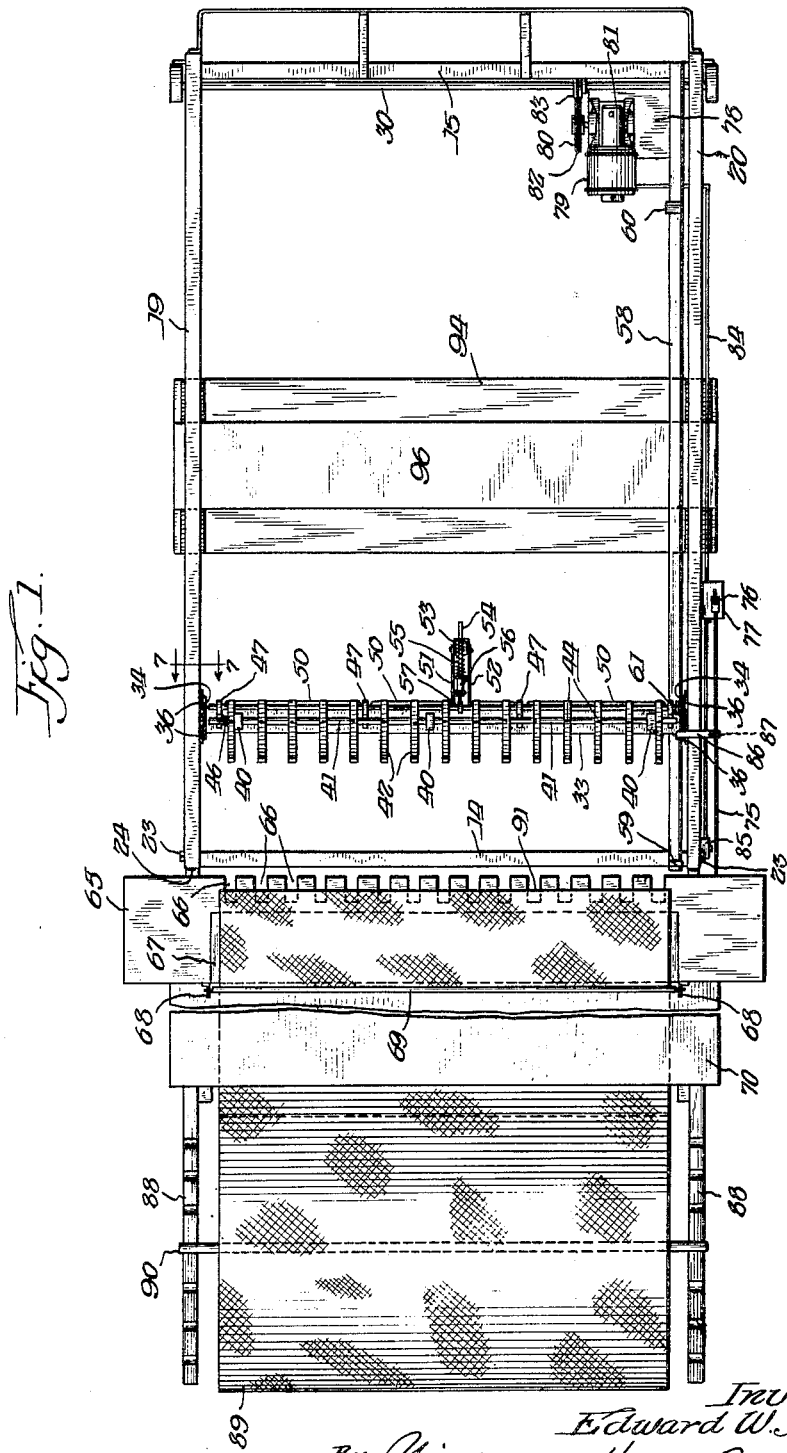

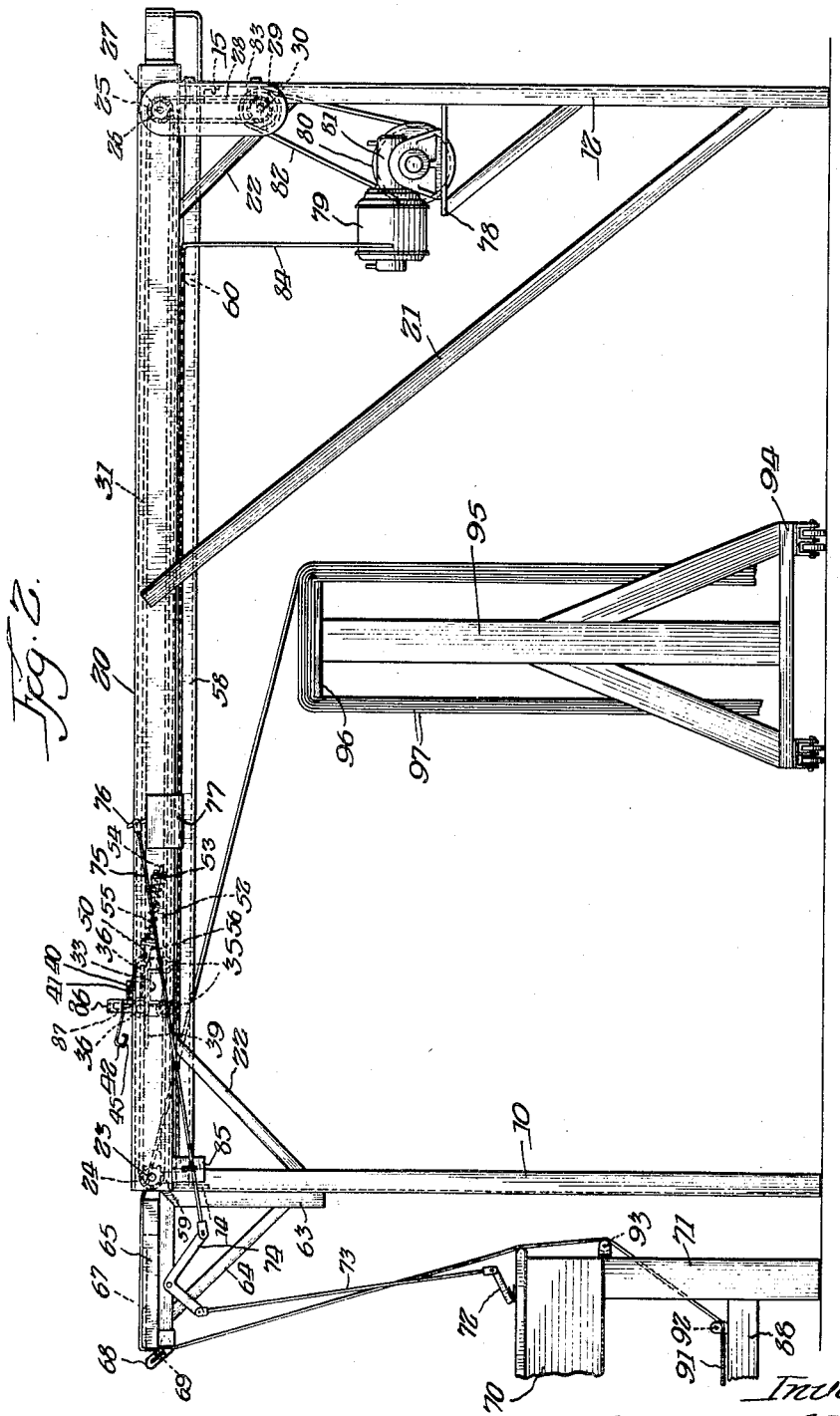

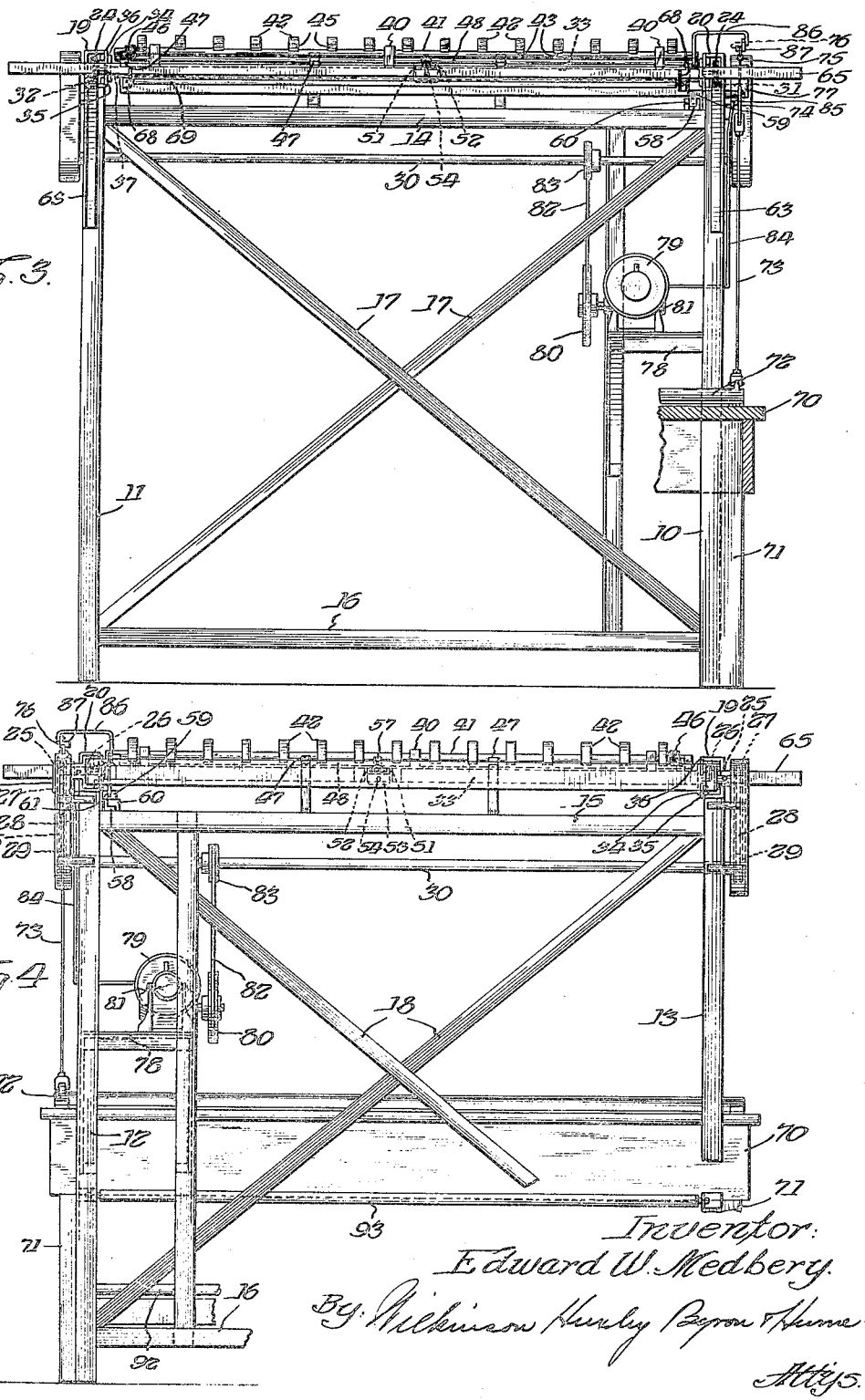

Sept. 19, 1950  E. W. MEDBERRY  2,523,224
RECIPROCATING FEED MECHANISM
Filed June 10, 1947  4 Sheets-Sheet 4
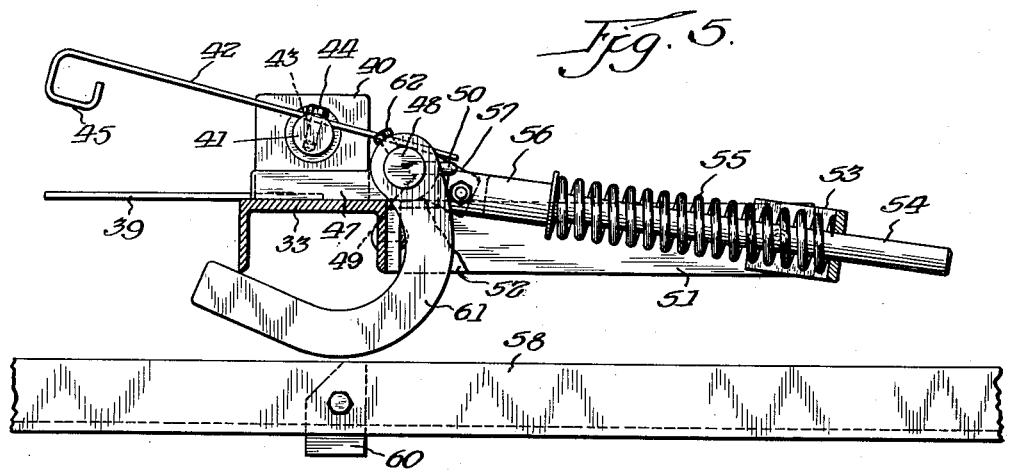
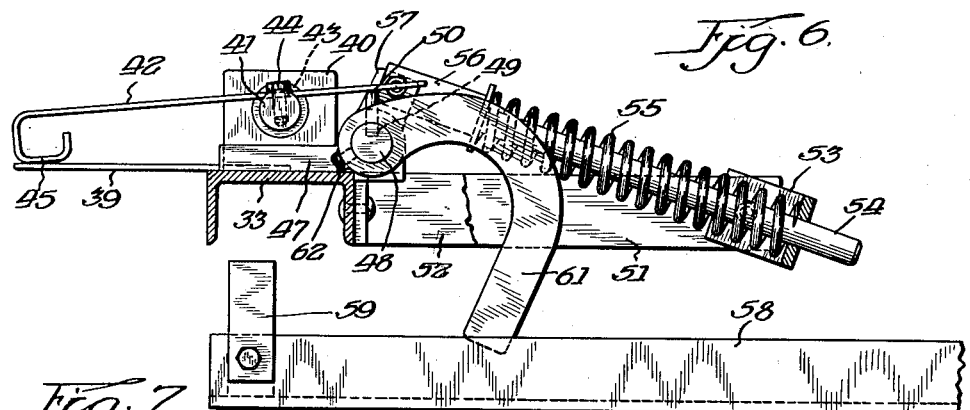
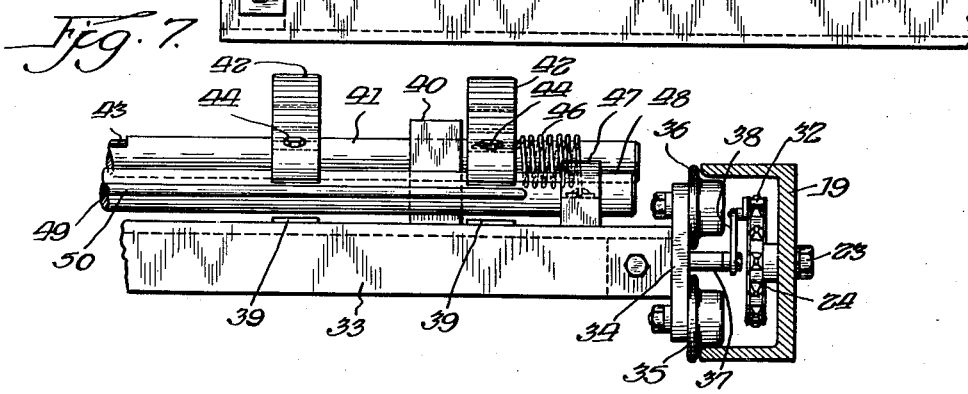
Inventor:
Edward W. Medberry.

Patented Sept. 19, 1950

2,523,224

UNITED STATES PATENT OFFICE 2,523,224

RECIPROCATING FEED MECHANISM

Edward W. Medbery, Arlington Heights, Ill., assignor to Marshall Field & Company, Chicago, Ill., a corporation of Illinois Application June 10, 1947, Serial No. 753,821

14 Claims. (Cl. 271—2.5)

My invention relates to a cutting and piling table and has particular reference to an apparatus which is used in the cutting of lace curtain material into suitable curtain lengths from a continuous roll formed as the material is woven on the looms or may be taken from bags into which the lace material is placed when removed from the looms if desired instead of from the rolls.

Another and further object of my invention is the provision of an apparatus having a power operated carriage thereon by means of which the woven lace material is unwound from the roll and pulled over a cutting board where an operator by means of a pair of hand operated shears or the like severs a piece of material from the continuous strip into such lengths as may be desired for future manufacturing operations.

Another and further object of my invention is the provision of a cutting table in which the severed pieces of material drop by gravity onto a movable rack as they are severed from the main piece of material, with one severed piece after another dropped onto the rack, the rack preferably being mounted on rollers so that the rack and material can be moved to any desired place for sewing and hemming operations or the like, which may be desired to be performed upon the material after it is severed into lengths.

Another and further object of my invention is the provision of a cutting mechanism by means of which one operator can perform the services and cut as much material as two or three operators could do by hand, and perform the work much more accurately and in such a manner that the material is left in good condition for future operations.

Another and further object of my invention is the provision of an open top frame having a cutting table thereon and in which the operating mechanism can be so adjusted that a predetermined length of material can be cut from the material as it is unwound from a roll without measurement or without particular attention on the part of the operator the severed length falling through the open top frame after it is severed.

These and other objects of my invention will be more fully and better understood by reference to the accompanying drawings and in which:

Figure 1 is a plan view of my improved cutting table,

Figure 2 is a side elevational view of the table shown in Figure 1,

Figure 3 is a front elevational view of the table,

Figure 4 is a rear elevational view of the table, a portion of the supporting members being broken away, Figure 5 is a detailed view of the gripping fingers and operating means therefor in open position, Figure 6 is a detail view of the operating fingers shown in closed position, and Figure 7 is a sectional view on line 7—7 of Figure 1.

Referring now specifically to the drawings and in which like reference characters refer to like parts throughout, corner posts 10, 11, 12 and 13 are provided with an upper transversely extending member 14 being provided at the front end which is attached to the posts 10 and 11 near their top ends, while a similar cross member 15 is provided at the rear end of the table which joins the posts 12 and 13 near their upper ends. Lower cross members 16, 16 are secured to the lower ends of each pair of the corner posts 10 and 11 and 12 and 13 respectively, while diagonal braces 17, 17 are provided which extend from the juncture of the members 16, 16 and the corner posts 11 and 12 to the upper ends of these same corner posts to provide a suitable bracing at the front end of the frame, while similar braces 18, 18 are provided at the rear of the frame and serve to cross brace the table at the rear end thereof.

Side rails 19 and 20 are provided which are preferably of channel shape in cross section having web portions and flange portions integrally formed with the web portion, the flange portions extending inwardly toward each other to provide tracks for certain of the operating parts hereinafter described.

At the rear end of the structure diagonal braces 21, 21 are provided which are secured at their lower ends to the corner posts 12 and 13 and to the side rails 19 and 20 at their upper ends, while shorter braces 22, 22 are provided at both ends of the frame which are connected at their lower ends to the corner posts and at their upper ends to the side rails 19 and 20 so the whole frame structure is securely braced and held firmly against collapse because of the weight of the equipment, goods and material placed thereon and some six feet in height so that racks can be placed in position upon which the severed pieces of material may fall.

Stub shafts 23, 23 are mounted in the webs of the rails 19 and 20 at the front ends thereof, each of said shafts having sprocket wheels 24, 24 on the inner ends thereof, while at the rear end of the frame other shafts 25, 25 are mounted which have sprocket wheels 26, 26 mounted on the inner ends of the said shafts 25, 25 with other sprocket wheels 27, 27 being mounted on the outer ends of the shafts 25, 25 over which sprocket chains 28, 28 operate which are connected with other sprocket wheels 29, 29 mounted on a power shaft 30 which is suitably mounted on brackets secured to the posts 12 and 13 near the upper ends thereof, and through which power is transmitted to a pair of endless sprocket chains 31 and 32 which operate over the sprocket wheels 24, 24 on the shafts 23, 23 at the front end of the table and over the sprockets 26, 26 mounted on the shafts 25, 25, at the rear end of the table, these chains 31 and 32 operating inside of the flanges of each of the side rails 19 and 20 respectively.

A movable carriage is provided which comprises a frame member 33 on the ends of which are brackets 34, 34 upon which lower wheels 35, 35 are mounted and upper wheels 36, 36 are mounted, the lower wheels 35, 35 traveling on the upper edge of the lower flanges of the rails 19 and 20, while the upper wheels 36, 36 are mounted just below the upper flanges on the side rails 19 and 20, each of these wheels 35, 35 and 36, 36 having peripheral flanges thereon adjacent the brackets 34, 34 which contact with the edges of the flanges on the side rails 19 and 20 as the carriage operates. Each of said brackets 34, 34 have pins 37, 37 therein to which links 38, 38 are attached, the inner ends of the links being secured to the pins 37, 37, while the outer ends of the links 38, 38 are secured to a link forming a part of the sprocket chains 31 and 32 in any approved manner, as by a pin and link connection. The links 38, 38 are movably mounted, so as to be able to turn as the chains 31 and 32 pass around the sprocket wheels over which they run, so that through the movement of sprocket chains 31 and 32 the carriage is caused to travel from one end of the frame to the other on the tracks provided by the flanges on the side rails 19 and 20.

Mounted on the upper side of the frame member 33 and projecting laterally therefrom in spaced relation with each other is a plurality of spring fingers 39, 39 which move bodily with the carriage of which the frame member 33 forms a part. Also mounted on the frame member 33 are brackets 40, 40 having a shaft 41 mounted therein and to which a series of spaced spring fingers 42, 42 are mounted intermediate their ends, these fingers being mounted in kerfs 43 formed in the upper side of the shaft 41 and secured in position by means of bolts 44, 44 and are in vertical register with the fixed fingers 39, 39. The forward end of the fingers 42, 42 are turned into D formation so that flat surfaces 44, 45 are presented which engage against the upper surfaces of the fingers 39, 39 between which the free edge of the cloth is gripped, as will be described hereinafter. A coil spring 46 is provided on the shaft 41 anchored at one of its ends to the shaft 41 and at its other ends to one of a plurality of brackets 47, 47 also secured to the cross member 33. The spring 46 normally exerts its force in a direction to move the fingers 42, 42 away from the fixed fingers 39, 39 and tends to open the fingers 42, 42 to the position shown in Figure 5 of the drawings.

The brackets 47, 47 have a shaft 48 mounted in trunnions formed at one side of the brackets 47, 47, which extends parallel with the frame member 33 and which has a longitudinal slot 49 formed therein within which a cam member 50 is mounted, this cam member 50 engaging under the rear ends of the fingers 42, 42 upon the rotation of the shaft 48 in a counter-clockwise direction thereby closing the fingers 42, 42 against the fingers 39, 39 in the position shown in Figure 6 of the drawings.

Extending rearwardly from the frame member 33 is a pair of brackets 51 and 52 upon which stirrup member 53 is mounted which has a rod 54 mounted therein upon which a spring 55 is mounted with an enlarged portion 56 at the front end thereof which in turn is bolted to a bracket 57 mounted upon the shaft 48. The bracket 57, the rod 54 and the spring 55 combination forms a toggle connection by means of which the shaft 48 is held in two fixed non-rotatable positions as shown particularly in Figures 5 and 6, where with the fingers 42, 42 in open position the centers of the shaft 48, and bolt connection to the rod 54 with the bracket 57 are slightly below center position, while in Figure 6, the fingers 42, 42 are in closed and off center position and the cam member 50 under the rear ends of the fingers 42, 42 holding them in closed position.

A track 58 is mounted at each of its ends on the upper cross members 14 and 15 and extends alongside of and slightly below the side rail 20 and has a stop 59 thereon near the front end of the track 58 and a movable stop 60 thereon near the rear end of the track 58 which controls the opening and closing of the fingers 42, 42. A U shaped lever 61 is mounted on one end of the shaft 48 and is held in position by a bolt 62 with its free end above the track 58 and alternately engages the stops 59 and 60 on the track 58 as the carriage travels from one end of the table to the other, thereby opening and closing the fingers 42, 42 for the purpose of enabling the fingers 42, 42 and 39, 39 to engage the goods or be disengaged therefrom.

At the forward end of the apparatus mounted on the legs 10 and 11 by means of L shaped brackets 63, 63 and having diagonal braces 64 thereon, is a cutting table 65, this table 65 having a plurality of recesses 66, 66 therein of a contour to receive the spring fingers 39, 39 so that when the carriage is at its farthermost point of travel at the front of the apparatus the spring fingers 39, 39 are received into these recesses so the fingers 39, 39 are even with the top of the table 65, and therefore easy for the operator to position the free end of the goods over the ends of the spring fingers 39, 39. An insert 67 providing a suitable cutting surface is provided in the face of the table 65 over which the operator works when severing the material into curtain lengths with an ordinary pair of shears.

Brackets 68, 68 mounted on the forward edge of the table 65 have a roller 69 mounted therein, the brackets 68, 68 being slotted and projecting upward at an angle from the edge of the table 65 with the axle of the roller 69 being mounted in the slots to insure that the roller 69 rests against the edge of the table 65 with the curtain material being passed between the edge of the table 65 and the roller 69 which serves both as a guide for the material passing over the table and also because of the angular position of the brackets the roller 69 is held against the edge of the table, thereby providing holding means for the end of material projecting therethrough when a curtain section is severed from the material.

An operator's stand 70 is provided supported by a plurality of legs 71, 71. The top of the operator's stand 70 is spaced upward from the floor a convenient height so the opeartor standing thereon can operate the machine and be in a position to use shears to sever the curtain sections from the roll of materials during the operation of the machine.

A foot treadle 72 is mounted on the top of the stand 70 having a rod 73 leading therefrom to a crank member 74 which in turn has a rod 75 leading therefrom and connected to a switch lever 76 mounted in a switch 77 which is attached to the outer face of the side rail 20.

At the rear of the frame mounted on a suitable platform 78 is a motor 79 suitably connected to a belt wheel 80 by means of gears mounted in the housing 81 with a belt 82 being provided which operates over the wheel 80 and a belt wheel 83 mounted on the shaft 30. Suitable electric connections are carried from the switch 77 to the motor 79 through a pipe 84 with a master switch 85 being placed at the forward end of the machine with suitable connections therethrough to the switch 77 by means of which electrical current passing through the motor can be controlled and the current shut off from the machine during complete shut down periods of the machine.

Attached to the cross member 33 of the carriage is an arm 86, this arm extending upward from the frame member 33 and above the side rail 20 with a link 87 mounted thereon which link 87 is mounted to oscillate freely in a clockwise direction, but is fixed against movement in a counter-clockwise direction. It is adapted to engage the switch lever 76 so that when the carriage is traveling towards the rear end of the machine, the link 87 engaging in the switch lever 76 passes freely thereover without affecting the switch lever in any fashion. As the carriage travels towards the front end of the machine the link 87 engages against the switch lever 76 and turns this lever 76 in a counter-clockwise direction thereby opening the circuit to the motor 79 and stopping the travel of the carriage.

A roll stand 88 is provided upon which a roll of woven material 89 is shown having a spindle 90 therethrough the ends of which are supported in recesses formed in the upper side of the roll stand 88. The free end of the curtain material 91 is drawn from the roll under a roller 92 mounted on the roll stand 88, engages against a roller 93 mounted on the side of the operator's stand 70 and passes upward under the roller 69 on the end of the cutting table 65 and over the top of the cutting table 65. As the free end of the material 91 rests upon the top of the cutting table 75, the roller 69 holds it from dropping to the floor or out of the reach of the operator.

A rack comprising a base member 94 with vertical members 95, 95 is provided at the upper ends of which a cross member 96 is mounted in any suitable manner with the base member 94 having rollers thereon so that the rack can be manually moved from place to place for such manufacturing operations as may be desired, this rack being placed approximately in a central position under the apparatus in a position to receive the severed curtain sections 97, 97 of material as they are cut from the continuous roll of material by the operator with a pair of shears across the cutting table 65.

In operation the apparatus is comparatively simple in that most curtain material is woven with severing lines therein or if such is not the case, suitable markings may be made on the cutting table, and the movable stop 60 placed in the proper position on the track 58, so that curtain sections of predetermined lengths are drawn from the continuous roll of material on each cycle of operation of the apparatus.

In commencing the cycle of operations, the operator grasps the free end of the material leading back to the roll places it in position in register with proper markings on the cutting table, and by placing her foot on the treadle 72 closes the switch 77 moving the switch lever 76 in a clockwise direction which starts the motor, causing the carriage to move forward towards the front of the frame. As the carriage moves up to the limit of its travel pulled by the sprocket chains 31 and 32, the end of the U shaped lever 61 engages against the fixed stop 59 rotating the shaft 48 in a counter-clockwise direction until the center of the shaft 48 and rod 54 are above center position where the spring 55 forces the cam member 50 around under the rear ends of the fingers 42, 42 rotating the shaft 41 and bringing the flat portions 45 of the fingers 42, 42 into engagement with the cloth thereby gripping the cloth between the fixed fingers 39, 39 and movable fingers 42, 42 which in the forward position of the carriage have entered the recesses 66, 66 thereby gripping the cloth firmly.

Because of the fact that the link connections of the carriage to the sprocket chains 31 and 32 must pass around the sprocket wheels 24, 24 there is a slight lag in the travel of the carriage thereby enabling these fingers to firmly grip the material. As the shaft 48 rotates the head of the bolt 62 engages against the top of the cross frame member 33 and acts as a limit stop to prevent further rotation of the shaft 48.

As the carriage travels towards the rear end of the apparatus the curved surface of the lever 61 engages against the angular surface of the stop 60, rotates the shaft 48 in a clockwise direction thereby moving the cam 50 out of engagement with the rear ends of the fingers 42, 42, the spring 46 forces the fingers 42, 42 to open position, and the lever 61 is turned into engagement with the cross member 33 to prevent a further rotative movement. The toggle connection is again off center in a lower position, so that the fingers 42, 42 are held in an open position, the goods are released and the forward end of the piece of material drops by gravity onto the cross member 96 of the rack placed in position to receive the cut curtain sections. As the material is released from the fingers, the operator, by using the shears across the cutting table, severs the curtain from the continuous piece of material, and the end of this material adjacent the operator drops over the rack and is supported thereon, the rack being of sufficient height so that the free ends of the cut curtain sections are held out of contact with the floor as the rack when filled is moved to positions for hemming, stitching, inspection or the like.

In the meantime the carriage has traveled to the rear end of the apparatus and has returned towards the front end where the link 87 on the arm 86 engages the switch lever 76 breaking the circuit connection to the motor. The carriage because of its momentum will run a short distance past the switch 77 where it stops until the operator is ready to feed the free end of the material into the carriage between the fingers as heretofore described, and when in position she closes the switch 77 by means of the treadle 72 and the carriage comes forward, grips the free edge of the material and pulls a section of the material from the roll towards the rear of the apparatus where it is released as heretofore described and drops by gravity over the previous severed curtain section supported by the rack, whereupon the operator using a pair of shears severs another piece from the continuous material coming from the roll and it is dropped from the rack in the same fashion as hereinabove described. These operations are repeated until all the material is used on the roll or the rack is filled to a convenient capacity. A new roll of material can be supplied or a new rack can be supplied so that the cutting operation is practically a continuous one operated by one person and interrupted only by the necessity of supplying a new roll of material or a new rack.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. Cloth handling apparatus comprising in combination a frame including side rails having carriage tracks thereon a cutting table on said frame, a carriage comprising a frame member, wheels on said frame member at each end thereof, a plurality of gripping fingers on said carriage, actuating means for the gripping fingers whereby the said gripping fingers are opened and closed at pre-determined points of travel of the said carriage, endless chains mounted on said side rails, power actuating means for said chains, a switch whereby the power actuating means is controlled, manual means for closing the said switch and automatic means on the said carriage whereby the said switch is opened with each cycle of operation of the carriage.

2. Cloth handling apparatus comprising a frame, a cutting table thereon, a travelling carriage, a plurality of sets of gripping fingers on the said carriage, actuating means for one set of fingers whereby they are brought into and out of engagement with the other set of fingers, a pair of endless chains on the said frame, means whereby the said carriage is connected to the said chains at each of its ends, power actuating means for the said chains whereby the carriage is caused to travel from one end of the frame to the other, a switch controlling the operation of the power means, manual means whereby the said switch is closed and a switch actuating member on said carriage whereby the switch is automatically opened.

3. Cloth handling apparatus comprising a frame, a cutting table thereon, a travelling carriage, a plurality of sets of gripping fingers on the said carriage, actuating means for one set of fingers whereby they are brought into and out of engagement with the other set of fingers, a pair of endless chains on the said frame, means whereby the said carriage is connected to the said chains at each of its ends, power actuating means for the said chains whereby the carriage is caused to travel from one end of the frame to the other, a switch controlling the operation of the power means, manual means whereby the said switch is closed and an arm on said carriage to engage the switch and open in one direction of travel only of the said carriage.

4. Cloth handling apparatus comprising a frame, a cutting table thereon, a traveling carriage, a plurality of sets of gripping fingers on the said carriage, actuating means for one set of fingers whereby they are brought into and out of engagement with the other set of fingers, a pair of endless chains on the said frame, means whereby the said carriage is connected to the said chains at each of its ends, power actuating means for the said chains whereby the carriage is caused to travel from one end of the frame to the other, a switch controlling the operation of the power means, manual means whereby the said switch is closed and an arm in said carriage, a link on the said arm adapted to actuate the switch in one direction of travel only of the said carriage.

5. Cloth handling apparatus comprising a frame, a cutting table thereon, a travelling carriage, a plurality of sets of gripping fingers on the said carriage, actuating means for one set of fingers whereby they are brought into and out of engagement with the other set of fingers, a pair of endless chains on the said frame, means whereby the said carriage is connected to the said chains at each of its ends, power actuating means for the said chains whereby the carriage is caused to travel from one end of the frame to the other, a switch controlling the operation of the power means, manual means whereby the said switch is closed and an arm in said carriage, a link on the said arm adapted to actuate the switch in one direction of travel of the said carriage and to rotate freely on its engagement with the switch when the carriage travels in the opposite direction.

6. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of cloth gripping fingers on said carriage and a plurality of stops on said frame whereby the fingers are opened and closed at predetermined times.

7. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a plurality of movable gripping fingers on said carriage mounted for co-operation with the fixed fingers, means on the carriage whereby the movable fingers are brought into and out of gripping engagement with the fixed fingers, and tripping means on the said frame for automatic control of said means on the carriage for the control of the movable fingers.

8. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a rocking shaft on said carriage, gripping fingers mounted on said rocking shaft, means on the carriage whereby the said rocking shaft is actuated bringing the gripping fingers mounted thereon into and out of engagement with the fixed gripping fingers, and control means on the said frame whereby the rocking shaft actuating means is operated at pre-determined times.

9. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a rocking shaft on said carriage, gripping fingers mounted on said rocking shaft intermediate their ends, means on the carriage whereby the said rocking shaft is actuated through the fingers mounted thereon bringing the gripping fingers mounted thereon into and out of engagement with the fixed gripping fingers, and control means on the said frame whereby the rocking shaft actuating means is operated at predetermined times.

10. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a rocking shaft on said carriage, gripping fingers mounted on said rocking shaft intermediate their ends, a rotatable cam shaft on said carriage mounted for engagement with the rear ends of the fingers and actuating means on said carriage for the said cam shaft.

11. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a rocking shaft on said carriage, gripping fingers mounted on said rocking shaft intermediate their ends, a rotatable cam shaft on said carriage mounted for engagement with the rear ends of the fingers, a lever on the said cam shaft, spaced stops on the said frame with which the lever engages, and spring actuating and holding members for the said cam shaft.

12. Cloth handling apparatus comprising in combination a frame, a cutting table on said frame, a travelling carriage on said frame, endless chains on said frame to which said carriage is connected, a motor, power transmission means from said motor to the said chains, a switch on said frame to control the operation of the motor, manually operable means for closing the said switch, automatic switch engaging means on said carriage whereby said switch is opened, a plurality of fixed gripping fingers on said carriage, a rocking shaft on said carriage, gripping fingers mounted on said rocking shaft intermediate their ends, a rotatable cam shaft on said carriage mounted for engagement with the rear ends of the fingers, a lever on the said cam shaft, spaced stops on the said frame with which the lever engages, and spring actuating and holding members for the said cam shaft, the said lever being capable of passing over one of said stops.

13. Cloth handling apparatus comprising in combination a frame having side rails thereon, a cutting table on said frame, a carriage, wheels mounted on the said carriage running on the said side rails, endless chains on the said frame at each side thereof, means connecting the said carriage at each of its ends to said endless chains, sprocket wheels on the said frame upon which the said chains are mounted, a motor, power transmitting means from said motor to the said chains, a plurality of fixed cloth gripping fingers on said carriage, a plurality of movable fingers cooperating with the said fixed fingers, finger opening and closing means on said carriage, actuating means at one end of said frame whereby the said fingers are closed and means at the other end of the said frame whereby the said fingers are opened, a switch controlling the said motor, manual means whereby the switch is closed and automatic means whereby the said switch is opened with each cycle of operation of the said carriage.

14. Cloth handling apparatus comprising in combination a frame having side rails thereon, a cutting table on said frame, a carriage, wheels mounted on the said carriage running on the said side rails, endless chains on the said frame at each side thereof, means connecting the said carriage at each of its ends to said endless chains, sprocket wheels on the said frame upon which the said chains are mounted, a motor, power transmitting means from said motor to the said chains, a plurality of fixed cloth gripping fingers on said carriage, a plurality of movable fingers cooperating with the said fixed fingers, finger opening and closing means on said carriage, actuating means at one end of said frame whereby the said fingers are closed and means at the other end of the said frame whereby the said fingers are opened, a switch controlling the said motor, a foot treadle, connections to the switch from the foot treadle whereby the switch is closed and automatic means whereby the said switch is opened with each cycle of operation of the said carriage.

EDWARD W. MEDBERY.

REFERENCES CITED

The following references are of record in the file of this patent:

UNITED STATES PATENTS

| Number | Name | Date |
|---|---|---|
| 1,208,084 | Bosch | Dec. 12, 1916 |
| 1,826,498 | Bignell | Oct. 6, 1931 |
| 1,976,834 | Carland et al. | Oct. 16, 1934 |
| 2,168,415 | Laukhuff | Aug. 8, 1939 |